Patented Apr. 25, 1939

2,155,630

UNITED STATES PATENT OFFICE 2,155,630

TREE SPRAY OIL

John A. Anderson, Olympia Fields, Ill., assignor to Standard Oil Company, Chicago, Ill., a corporation of Indiana No Drawing. Application August 15, 1935, Serial No. 36,347

4 Claims. (Cl. 167—28)

This invention relates to insecticidal oils for tree sprays and pertains more particularly to an oil composition which will increase the effectiveness of the oil on the plant leaves without causing plant injury.

An object of my invention is to make oils available for summer sprays which have heretofore been too injurious because of their tendency to penetrate into the leaf and their tendency to cause yellowing, leaf burn, etc. A further object is to provide a composition which will increase the safety factor of oils which contain unsaturated components and oils which are characterized by low unsulfonatable residues. A further object is to provide a method and means for regulating and controlling the effective viscosities of tree spray oils. A further object is to provide a more effective means for regulating the penetration of oil into plant leaves than has heretofore been known. Other objects will be apparent from the following detailed description.

My invention relates to the use of certain oil soluble, viscous, resinous materials which, because of their properties will be hereinafter termed visco-resins, abbreviated VR. I have discovered that when visco-resins are added to light mineral oil distillates the effective viscosity of the distillates is increased, the absorption characteristics are modified (there is a marked retardation of oil penetration) and there is a radical improvement in the safety and effectiveness of the oil as a tree spray. This effect is not due to increased toxicity since the visco-resins apparently do not act as poisons or parasiticides. Chemical inertness is one of their outstanding properties. The function of the visco-resins is to modify the properties of the oil so that when it is spread upon the leaf in a thin film the oil will not cause injury to the leaf even though it is of relatively low viscosity and boiling range and even though the oil is of a lower degree of refinement than could otherwise be used.

The visco-resins of my invention may be prepared by various synthetic processes such as by the hydrogenation of rubber, natural rubber, butadiene rubber, cyclo rubber, or other synthetic forms of rubber wherein the hydrogenation is carried out to effect substantially complete saturation. They may also be prepared by the polymerization of olefin hydrocarbons under conditions which produce materials of high molecular weight; for example, isobutylene may be cooled to −80° F. and contacted with about 0.2% of boron trifluoride which converts it into a colorless, plastic material of high molecular weight. The method of making these visco-resins is well-known and is described in a number of prior patents including: French Patent No. 771,272; British Patent No. 401,297. The method of making the visco-resins forms no part of the present invention and will not be described in further detail.

The visco-resins are oil soluble and have a molecular weight above 1000 and usually from about 1000 to 10,000. The hydrogen to carbon ratio is about 15 to 90 by weight. These visco-resins retain their plasticity at low temperatures, even as low as −100° F. They are usually free from crystallizable material, they are highly soluble in mineral oils of all viscosities, they are substantially colorless, they are remarkably stable against oxidation and sludge formation and are composed essentially of only two elements, hydrogen and carbon.

The outstanding characteristic of these visco-resins is their high viscosity at elevated temperatures. This has long been recognized as a desirable property of lubricating oils but I have discovered that it plays an extremely important part in tree spray oils, as will be hereinafter described. The resins also have the power of conferring viscosity on light oils to an outstanding degree.

In my preferred embodiments I apply my oil sprays in the form of an aqueous emulsion, although it should be understood that the advantages of my invention may be obtained by atomizing or fogging the oils, particularly when applied when plants and leaves are moist. These oils may be atomized and distributed over an orchard from an airplane, the application preferably being early in the morning when the trees are wet with dew. The invention is also applicable to emulsions of the mayonnaise type and to the so-called tank mix spray oils which are emulsified with calcium caseinate or other well-known emulsifiers.

I prefer to employ the general type of emulsifier described in Knight Patents 1,949,798-9. For instance, I may simply dissolve 1% of glycol monooleate in the oil and then emulsify the oil in about 98% of water by vigorous agitation. I may use about 3% of aluminum naphthenate, preferably dinaphthenate, with 1% of glycol monooleate and 1% of naphthenic acid, all percentages being based on oil; this oil may then be emulsified in about 96 to 99% of water, preferably by forcing it through a pump into mixing tank. Generally speaking, I prefer to employ aluminum naphthenates, with a sufficient amount of glycol mono-oleate or glyceryl mono- and di-oleates to effect desired release of oil on contact with plant leaves, the aluminum naphthenates usually ranging from ½ to 5% and the glycol or glyceryl oleates ranging from ½ to 2½%. Aluminum naphthenates are cited as examples of oil soluble salts of polyvalent metal cations which have a jelling and/or penetration retarding effect and glycol mono-oleate is cited as an example of a hydroxy ester of a high molecular weight organic acid.

The visco-resin may be incorporated into the oil in amounts from ½ to 5% and in some cases, particularly for deciduous use, even higher percentages may be employed. Examples of oils which have been tested with 2% and 4% of visco-resins are set forth in the following table, wherein $VR_1$ is hydrogenated rubber and $VR_2$ is an isobutylene resin prepared in the manner hereinabove described.

| Oil | Angle of contact | Saybolt viscosity | | Viscosity index | Disappeared from leaf after— | |
|---|---|---|---|---|---|---|
| | | (100) | (210) | | (2% VR) | (4% VR) |
| | Degrees | | | | Days | Days |
| Kerosene | 16.5 | | | | | 1 |
| Kerosene+4% $VR_1$ | 24.5 | 48.6 | 36 | 286 | | 8 |
| Mineral seal | 32 | 43 | 33.3 | 54 | 4 | 7 |
| Mineral seal+2% $VR_1$ | 31 | 61 | 37 | 185 | | 15 |
| Mineral seal+4% $VR_1$ | 35 | 96 | 43.5 | 200 | 28 | 30+(May) |
| Mineral seal+4% $VR_2$ | 34 | 53.6 | 35.7 | 164 | | 27 (July) |
| Technical white oil | 36 | 84 | 38.2 | | 31 | |
| Technical white oil+2% $VR_1$ | 41 | 160 | 47.2 | 142 | 60 | |

In the above table the angle of contact was measured by making photomicrographs of droplets of oil on glass slides coated with carnauba wax and actually measuring the angle on the photomicrograph. This is a rough test to get some idea of tendency of the oil to wet the leaf. Under the viscosity heading, the Universal Saybolt viscosities were calculated from the kinematic viscosities.

The first outstanding phenomena is the very large increase in angle of contact which is effected by adding visco-resin to kerosene and the almost unbelievably high viscosity index which is obtained thereby. Ordinarily kerosene is so light that viscosity measurements are not made on it and it is so injurious to plant leaves that it cannot be safely used in ordinary tree sprays. I have discovered that the added visco-resins not only markedly increase the effective viscosity and viscosity index of the kerosene, but they make it safe for application on plant leaves, retard its burning effect and tendency toward leaf penetration and make it function as a much heavier distillate.

The mineral seal oil does not show as marked a difference on angle of contact as the kerosene, but it does show material improvement in viscosity and viscosity index, and it shows a phenomenal effect in the regulation of oil penetration into plant leaves. Similar effects are shown by the technical white oil.

The remarkable degree to which visco-resins change the effect of kerosene as a scalecide is shown by the following tabulation of results on red scale (the oil being applied at 4%).

| | Per cent kill |
|---|---|
| Kerosene+1% glycerol mono oleate | 59.5 |
| Kerosene+4% $VR_1$+glycerol mono oleate | 90.7 |
| Kerosene+4% $VR_1$+glycerol mono oleate+1% naphthenic acid | 95.9 |

Mineral seal oil distillate and straw oil are examples of oils which are not sufficiently highly refined to be considered safe for use on sensitive foliage, although the unsulfonatable residue of such oils will probably be between 70 and 85, depending upon specific test employed,—in other words these oils contain a considerable amount of so-called "smoky hydrocarbons" which are removed by heavy acid treatment.

The following table will show the effect of visco-resins on the viscosity index of such oils:

| | Vis. at 100 | Vis. at 210 | V. I. |
|---|---|---|---|
| Mineral seal oil distillate | 43.4 | 33.4 | 38 |
| Mineral seal oil distillate+2% $VR_1$ | 57 | 36.3 | 173 |
| Mineral seal oil distillate+4% $VR_1$ | 86 | 41.5 | 198 |
| Straw oil | 80.8 | 37.6 | 68 |
| Straw oil+2% $VR_1$ | 157.7 | 46.2 | 133 |
| Straw oil+4% $VR_1$ | 258.1 | 58.3 | 144 |

The significant fact concerning mineral seal oil distillate, straw oil, etc. is that the addition of visco-resins makes them usable as summer sprays when they could not otherwise be used. This is probably due to a large extent to the retardation of absorption and penetration, but it may also be due to the stabilizing effect and the unusual chemical inertness of the visco-resins.

When oils containing visco-resins are applied in high concentrations there may be a tendency toward yellowing, leaf drop, twig burn, etc., but these injuries may be avoided by using lower oil concentrations. The outstanding feature of my invention is provision of an oil which may be applied as a very thin tenuous film which will remain on the leaf long enough to kill the most resistant insects. Light oils can be made more efficient as insecticides than heavier oils, and at the same time, much cheaper. It should be mentioned that when kerosene, mineral seal oil distillate or straw oil are applied even at 2% in the absence of visco-resins, they often cause serious injury and sometimes cause complete defoliation. Kerosene evaporates from the leaves or from waxed slides in 20 or 30 hours. When it contains a visco-resin its evaporation tendencies are markedly changed,—it persists for eight days and then leaves a thin tenuous film which adheres to the foliage and, being substantially inert, does the trees no damage. In fact, it seems to serve as an additional protection against insect attack after the oil has evaporated.

I claim:

1. An insecticidal tree spray oil comprising a mineral distillate having a Saybolt viscosity of from about 40 to 80 at 100° F., to which has been added about ½ to 5% of an oil soluble visco-resin.

2. The composition of claim 1 wherein the visco-resin is hydrogenated rubber.

3. The composition of claim 1 wherein the visco-resin is polymerized isobutylene.

4. An insecticidal tree spray as defined by claim 1 which contains about 1% to 5% of an oil-soluble emulsifier.

JOHN A. ANDERSON.